United States Patent
Kim et al.

(10) Patent No.: US 9,613,752 B2
(45) Date of Patent: Apr. 4, 2017

(54) MULTILAYER CERAMIC ELECTRONIC COMPONENT AND MOUNTING BOARD THEREFOR

(71) Applicant: SAMSUNG ELECTRO-MECHANICS CO., LTD., Suwon, Gyunggi-do (KR)

(72) Inventors: Mi Young Kim, Gyunggi-do (KR); Dae Bok Oh, Gyunggi-do (KR); Jae Yeol Choi, Gyunggi-do (KR); Wi Heon Kim, Gyunggi-do (KR); Sang Huk Kim, Gyunggi-do (KR)

(73) Assignee: SAMSUNG ELECTRO-MECHANICS CO., LTD., Gyunggi-Do (KR)

( * ) Notice: Subject to any disclaimer, the term of this patent is extended or adjusted under 35 U.S.C. 154(b) by 0 days.

(21) Appl. No.: 14/049,139

(22) Filed: Oct. 8, 2013

(65) Prior Publication Data

US 2014/0307362 A1   Oct. 16, 2014

(30) Foreign Application Priority Data

Apr. 16, 2013 (KR) .................. 10-2013-0041870

(51) Int. Cl.
| | |
|---|---|
| *H01G 4/30* | (2006.01) |
| *H01G 4/12* | (2006.01) |
| *H01G 4/232* | (2006.01) |
| *H01G 4/20* | (2006.01) |
| *H01G 4/012* | (2006.01) |
| *H01G 2/06* | (2006.01) |

(Continued)

(52) U.S. Cl.
CPC .............. *H01G 4/12* (2013.01); *H01G 4/012* (2013.01); *H01G 4/30* (2013.01); *H01G 2/065* (2013.01)

(58) Field of Classification Search
CPC   H01G 4/30; H01G 4/232; H01G 9/15; H01G 4/1227; H01G 4/12

(Continued)

(56) References Cited

U.S. PATENT DOCUMENTS

| | | | |
|---|---|---|---|
| 2005/0088803 | A1 | 4/2005 | Umeda et al. |
| 2008/0144253 | A1* | 6/2008 | Togashi .................. H01G 4/30 361/301.4 |

(Continued)

FOREIGN PATENT DOCUMENTS

| | | |
|---|---|---|
| CN | 103000371 A | 3/2013 |
| JP | 5-74644 A | 3/1993 |

(Continued)

OTHER PUBLICATIONS

Korean Office Action issued in Korean Application No. 10-2013-0041870 dated Jun. 19, 2014, w/English translation.

(Continued)

*Primary Examiner* — Eric Thomas
*Assistant Examiner* — Arun Ramaswamy
(74) *Attorney, Agent, or Firm* — McDermott Will & Emery LLP

(57) ABSTRACT

There are provided a multilayer ceramic electronic component and a mounting board therefor, the multilayer ceramic electronic component, including a ceramic body having a hexahedral shape, including dielectric layers, and satisfying T/W > 1.0 when a length of the ceramic body is defined as L, a width of the ceramic body is defined as W, and a thickness of the ceramic body is defined as T, and first and second internal electrodes stacked in the ceramic body to face each other, having the respective dielectric layers interposed therebetween.

6 Claims, 6 Drawing Sheets

(58) Field of Classification Search
USPC .............................. 361/321.1, 301.4, 321.2
See application file for complete search history.

(56) References Cited

U.S. PATENT DOCUMENTS

| | | | |
|---|---|---|---|
| 2008/0310076 A1* | 12/2008 | Ritter et al. | 361/302 |
| 2009/0128989 A1* | 5/2009 | Suzuki et al. | 361/321.4 |
| 2012/0194031 A1 | 8/2012 | Ogawa et al. | |
| 2012/0298407 A1 | 11/2012 | Ahn et al. | |
| 2013/0063862 A1 | 3/2013 | Kim et al. | |
| 2014/0268488 A1 | 9/2014 | Hattori et al. | |

FOREIGN PATENT DOCUMENTS

| | | | |
|---|---|---|---|
| JP | 08-055752 A | | 2/1996 |
| JP | 09-260184 A | | 10/1997 |
| JP | 10-335167 A | | 12/1998 |
| JP | 2003-243251 A | | 8/2003 |
| JP | 2005-129802 A | | 5/2005 |
| JP | 2005259772 A | * | 9/2005 |
| JP | 2007-134375 A | | 5/2007 |
| JP | 2007-294886 A | | 11/2007 |
| JP | 2012-248846 A | | 12/2012 |
| JP | 2014-199912 A | | 10/2014 |
| KR | 10-2012-0089199 A | | 8/2012 |

OTHER PUBLICATIONS

Japanese Office Action issued in Japanese Application No. 2013-213493, dated Mar. 24, 2015, with English translation.
Korean Office Action issued in Korean Application No. 10-2013-0041870 dated Jan. 14, 2015, with English translation.
Chinese Office Action dated Jun. 6, 2016 issued in Chinese Patent Application No. 201310526129.1. (w/ English translation).

* cited by examiner

MULTILAYER CERAMIC ELECTRONIC COMPONENT AND MOUNTING BOARD THEREFOR

CROSS-REFERENCE TO RELATED APPLICATIONS

This application claims the benefit of Korean Patent Application No. 10-2013-0041870 filed on Apr. 16, 2013, with the Korean Intellectual Property Office, the disclosure of which is incorporated herein by reference.

BACKGROUND OF THE INVENTION

Field of the Invention

The present invention relates to a multilayer ceramic capacitor and a structure for mounting a multilayer ceramic capacitor on a circuit board.

Description of the Related Art

In accordance with the recent trend for the miniaturization of electronic products, demand for a multilayer ceramic electronic component having a small size and high capacitance has increased.

Therefore, dielectric layers and internal electrodes have been thinned and stacked in increasing amounts through various methods. Recently, as a thickness of individual dielectric layers has been reduced, multilayer ceramic electronic components having increased amounts of stacked layers included therein have been manufactured.

Therefore, multilayer ceramic electronic components may be miniaturized, and the dielectric layers and internal electrodes may be thinned, such that the dielectric layers and internal electrodes have been stacked in increasing amounts in order to implement a high degree of capacitance.

As described above, multilayer ceramic electronic components have been miniaturized and the number of stacked layers included therein has increased, such that multilayer ceramic electronic components have thicknesses greater than widths thereof, thereby implementing a high degree of capacitance. However, a defect in which a chip topples over when the multilayer ceramic electronic component is mounted on a board may be frequently generated with the use of such multilayer ceramic electronic components.

Meanwhile, in a process of manufacturing a multilayer ceramic electronic component, ceramic bodies may collide with each other to be broken, causing a chipping defect. Thus, in order to prevent this problem, a method of polishing corners and vertexes of ceramic bodies has been used.

However, in the case of polishing corners and vertexes of ceramic bodies, the corners and vertexes of ceramic bodies may be excessively or insufficiently polished, reliability of a multilayer ceramic electronic component may be affected thereby.

Thus, research into a technology of preventing a defect in which the multilayer ceramic electronic component topples over when being mounted on a board and a chipping defect, while implementing high capacitance thereof, to thereby improve reliability of the multilayer ceramic electronic component.

RELATED ART (Patent Document 1) Japanese Patent Laid-Open Publication No. 2005-129802

SUMMARY OF THE INVENTION

An aspect of the present invention provides a multilayer ceramic capacitor and a structure for mounting a multilayer ceramic capacitor on a circuit board.

According to an aspect of the present invention, there is provided a multilayer ceramic electronic component including: a ceramic body having a hexahedral shape, including dielectric layers, and satisfying $T/W > 1.0$ when a length of the ceramic body is defined as L, a width of the ceramic body is defined as W, and a thickness of the ceramic body is defined as T; and first and second internal electrodes stacked in the ceramic body to face each other, having the respective dielectric layers interposed therebetween.

At least one corner of the ceramic body in length, width, and thickness directions may have a round shape, and when a radius of curvature of the corner is defined as 'a', $0.01 \leq a/T \leq 0.07$ may be satisfied.

When an average thickness of the dielectric layers is td, $0.1\ \mu m \leq td \leq 0.6\ \mu m$ may be satisfied.

The first and second internal electrodes may respectively have a thickness of 0.6 µm or less.

The dielectric layers may be stacked in an amount of 500 layers or more.

The first and second internal electrodes may be stacked in a thickness direction of the ceramic body.

The first and second internal electrodes may be stacked in a width direction of the ceramic body.

According to another aspect of the present invention, there is provided a mounting board for a multilayer ceramic electronic component, the mounting board including: a printed circuit board having first and second electrode pads disposed thereon; and a multilayer ceramic electronic component mounted on the printed circuit board, wherein the multilayer ceramic electronic component includes: a ceramic body having a hexahedral shape, including dielectric layers, and satisfying $T/W > 1.0$ when a length of the ceramic body is defined as L, a width of the ceramic body is defined as W, and a thickness of the ceramic body is defined as T; and first and second internal electrodes stacked in the ceramic body to face each other, having the respective dielectric layers interposed therebetween.

At least one corner of the ceramic body in length, width, and thickness directions may have a round shape, and when a radius of curvature of the corner is defined as 'a', $0.01 \leq a/T \leq 0.07$ may be satisfied.

When an average thickness of the dielectric layers is td, $0.1\ \mu m \leq td \leq 0.6\ \mu m$ may be satisfied.

The first and second internal electrodes may respectively have a thickness of 0.6 µm or less.

The dielectric layers may be stacked in an amount of 500 layers or more.

The first and second internal electrodes may be stacked in a thickness direction of the ceramic body.

The first and second internal electrodes may be stacked in a width direction of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENT

Figure 1:
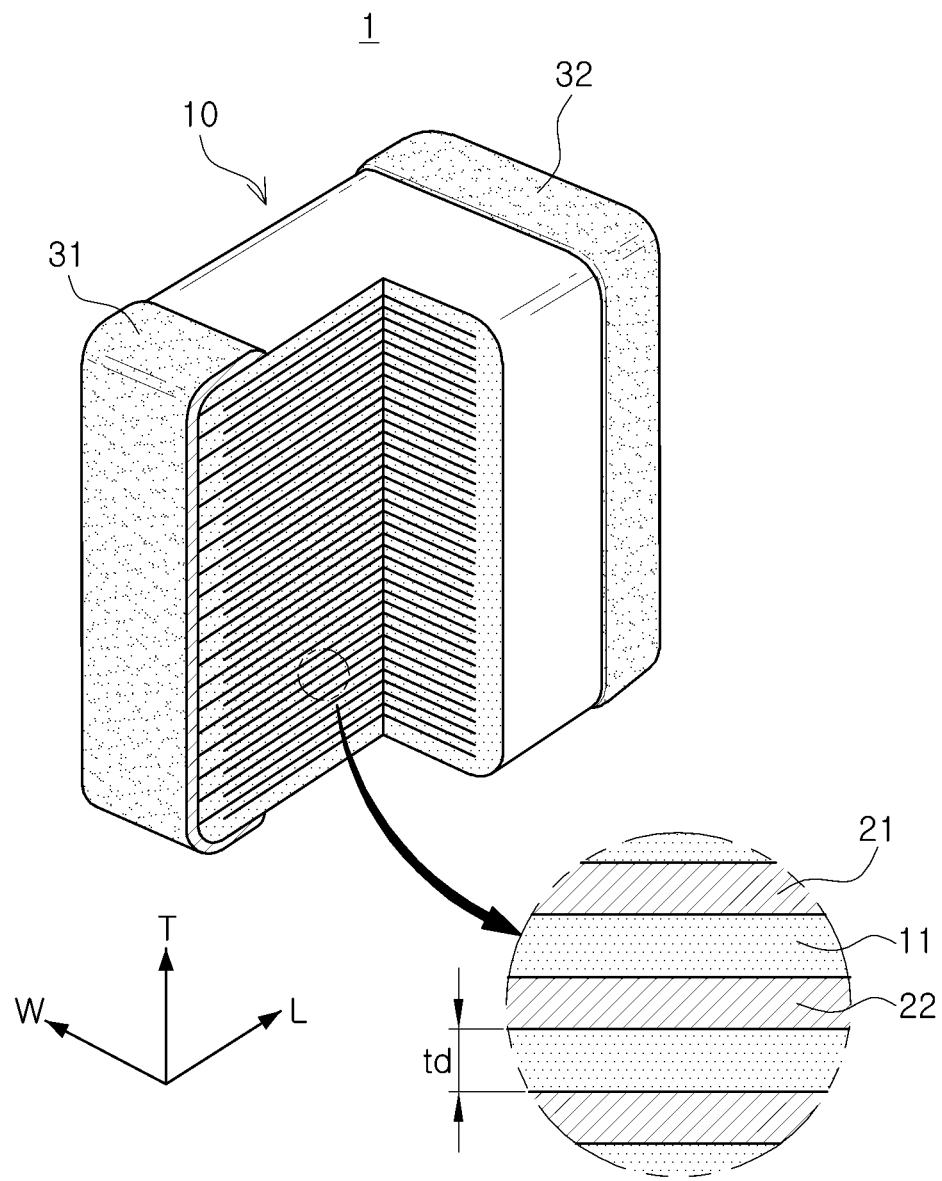
FIG. 1 is a schematic partially cutaway perspective view of a multilayer ceramic capacitor (MLCC) according to an embodiment of the present invention.

Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components.

Multilayer Ceramic Capacitor

Hereinafter, embodiments of the present invention will be described with reference to the accompanying drawings.

FIG. 1 is a schematic partially cutaway perspective view of a multilayer ceramic capacitor (MLCC) according to an embodiment of the present invention.

Figure 2:
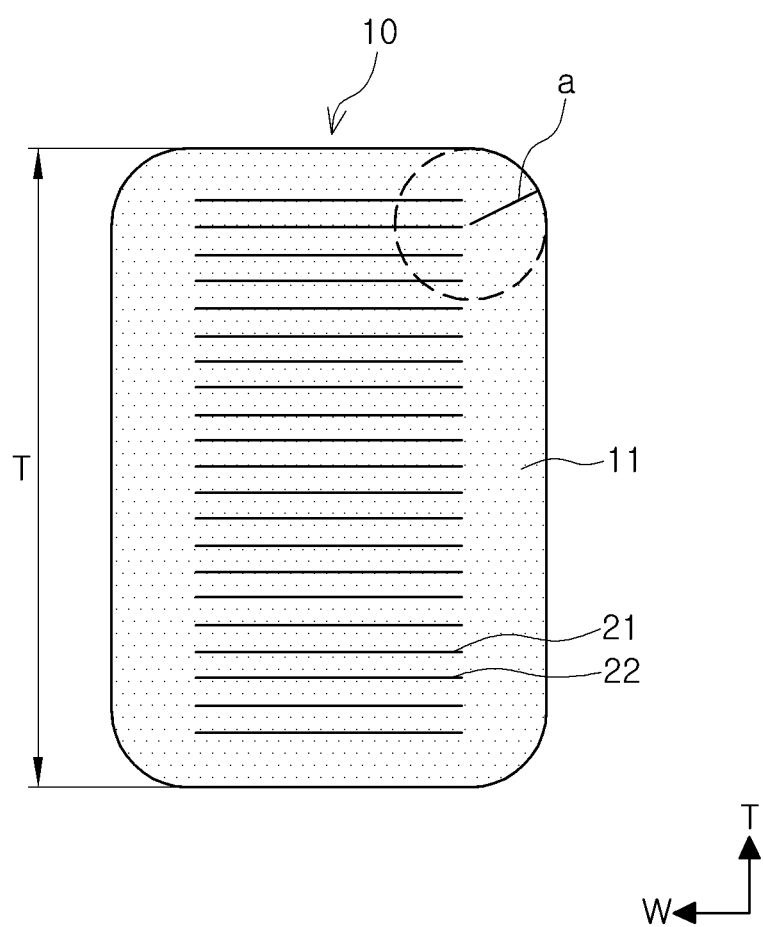
FIG. 2 is a cross-sectional view of the MLCC of FIG. 1 taken in a width direction.

FIG. 2 is a cross-sectional view of the MLCC of FIG. 1 taken in a width direction.

Referring to FIGS. 1 and 2, the multilayer ceramic electronic component according to the embodiment of the present invention may include: a ceramic body 10 having a hexahedral shape, including dielectric layers 11, and satisfying $T/W > 1.0$ when a length of the ceramic body is defined as L, a width of the ceramic body is defined as W, and a thickness of the ceramic body is defined as T; and first and second internal electrodes 21 and 22 stacked in the ceramic body 10 so as to face each other, having the respective dielectric layers 11 interposed therebetween.

Hereinafter, the multilayer ceramic electronic component according to the embodiment of the present invention will be described. Particularly, a multilayer ceramic capacitor will be described by way of example. However, the present invention is not limited thereto.

The ceramic body 10 is not particularly limited in view of a shape, and may have a hexahedral shape, for example.

Meanwhile, in the multilayer ceramic capacitor according to the embodiment of the present invention, a 'length direction' is defined as an 'L' direction, a 'width direction' is defined as a 'W' direction, and a 'thickness direction' is defined as a 'T' direction of FIG. 1. Here, the 'thickness direction' may be used as the same meaning as a direction in which the dielectric layers are stacked (that is, a stacking direction).

A multilayer ceramic capacitor 1 according to the embodiment of the present invention may include: the ceramic body 10 having a hexahedral shape, including the dielectric layers 11, and satisfying $T/W > 1.0$ when a length of the ceramic body is defined as L, a width of the ceramic body is defined as W, and a thickness of the ceramic body is defined as T; and the first and second internal electrodes 21 and 22 stacked in the ceramic body 10 so as to face each other, having the respective dielectric layers 11 interposed therebetween.

A material forming the first and second internal electrodes 21 and 22 is not particularly limited, but may be formed using a conductive paste formed of at least one of, example, a precious metal such as palladium (Pd), a palladium-silver (Pd—Ag) alloy, and the like, nickel (Ni), and copper (Cu).

The dielectric layers 11 may include a ceramic powder having a high dielectric constant, for example, a barium titanate ($BaTiO_3$) based powder, or a strontium titanate ($SrTiO_3$) based powder. However, the present invention is not limited thereto.

Meanwhile, the first and second internal electrodes 21 and 22 may be a pair of electrodes having different polarities and may be formed on the respective dielectric layers 11 by printing a conductive paste including a conductive metal at a predetermined thickness.

An average thickness of the first and second internal electrodes 21 and 22 after sintering is not particularly limited as long as capacitance may be formed thereby. For example, the average thickness of the first and second internal electrodes may be 0.6 μm or less.

The average thickness of the first and second internal electrodes 21 and 22 may be measured from an image obtained by scanning a cross-section of the ceramic body 10 in the width direction by using a scanning electron microscope (SEM) as shown in FIG. 2.

For example, as illustrated in FIG. 2, with respect to any internal electrode extracted from the image obtained by scanning the cross-section of the ceramic body 10 in a width-thickness (W-T) direction cut in a central portion of the ceramic body 10 in a length direction L, using the scanning electron microscope (SEM), the average thickness may be calculated by measuring respective thicknesses of the internal electrode at thirty points thereof having equal intervals therebetween in a width direction.

The thirty points having equal intervals therebetween may be measured in a capacitance formation part, and the capacitance formation part refers to a region in which the first and second internal electrodes 21 and 22 overlap each other.

In addition, in the case in which the measurement of the average thickness is applied to ten or more internal electrodes, such that the average of thicknesses of ten or more internal electrodes is measured, the average thickness of the internal electrodes may be significantly generalized.

Further, the first and second internal electrodes 21 and 22 may be formed to be alternately exposed through both end surfaces of the ceramic body 10 in the stacking direction of the dielectric layers 11, and may be electrically insulated from each other by the dielectric layers 11 disposed therebetween.

That is, the first and second internal electrodes 21 and 22 may be electrically connected to first and second external electrodes 31 and 32, respectively, through portions thereof in which the first and second internal electrodes 21 and 22 are alternately exposed to both end surfaces of the ceramic body 10.

Therefore, in the case in which voltage is applied to the first and second external electrodes 31 and 32, electric charges are accumulated between the first and second internal electrodes 21 and 22 facing each other. Here, capacitance of the multilayer ceramic capacitor 1 may be in proportion to an area of the region in which the first and second internal electrodes 21 and 22 overlap each other.

In order to form capacitance, the first and second external electrodes 31 and 32 may be formed on outer surfaces of the ceramic body 10 and may be electrically connected to the first and second internal electrodes 21 and 22, respectively.

The first and second external electrodes 31 and 32 may be formed of the same conductive material as that of the internal electrodes, but are not limited thereto. For example, the first and second external electrodes 31 and 32 may be formed of copper (Cu), silver (Ag), nickel (Ni), or the like.

The first and second external electrodes 31 and 32 may be formed by applying a conductive paste prepared by adding a glass frit to a metal powder to the outer surfaces of the ceramic body 10 and performing a sintering process.

The ceramic body 10 may be formed through a sintering process after stacking the plurality of dielectric layers 11 and in this case, a shape and a dimension of the ceramic body 10, and the number of the stacked dielectric layers 11 are not limited to being illustrated in the embodiment of the present invention, but the present invention is not limited thereto.

In addition, the plurality of dielectric layers 11 forming the ceramic body 10 may be in a sintered state and be integrated so as not to confirm boundaries between the adjacent dielectric layers without the scanning electron microscope (SEM).

According to the embodiment of the present invention, an average thickness td of the dielectric layers 11 may be arbitrarily changed according to a capacitance design of the multilayer ceramic capacitor 1, but may be 0.1 to 0.6 μm after the sintering process.

The average thickness td of the dielectric layers 11 may be measured from an image obtained by scanning the cross-section of the ceramic body 10 in the width direction using the SEM, as shown in FIG. 2.

For example, as illustrated in FIG. 2, with respect to any dielectric layer extracted from the image obtained by scanning the cross-section of the ceramic body 10 in the width-thickness (W-T) direction cut in a central portion of the ceramic body 10 in the length direction L, using the scanning electron microscope (SEM), the average thickness may be calculated by measuring respective thicknesses of the dielectric layer at thirty points thereof having equal intervals therebetween in a width direction.

The thirty points having equal intervals therebetween may be measured in the capacitance formation part, and the capacitance formation part refers to the region in which the first and second internal electrodes 21 and 22 overlap each other.

In addition, in the case in which the measurement of the average thickness is applied to ten or more dielectric layers, such that the average of thicknesses of ten or more dielectric layers is measured, the average thickness of the dielectric layers may be significantly generalized.

The number of stacked dielectric layers 11 is not particularly limited, but for example, 500 or more dielectric layers 11 may be stacked.

As described above, 500 or more dielectric layers 11 may be stacked, such that a high capacitance multilayer ceramic capacitor in which the thickness T of the ceramic body is greater than the width W of the ceramic body may be implemented.

Meanwhile, when the length of the ceramic body 10 is defined as L, the width thereof is defined as W, and the thickness thereof is defined as T, $T/W > 1.0$ may be satisfied.

In the multilayer ceramic capacitor 1 according to the embodiment of the present invention, the number of stacked dielectric layers may be increased in order to implement high capacitance, and the ceramic body 10 may have the thickness T thereof larger than the width W thereof.

A general multilayer ceramic capacitor has been manufactured in such a manner that the width and the thickness thereof are almost identical to each other.

However, since the multilayer ceramic capacitor according to the embodiment of the present invention may be miniaturized, a sufficient space may be secured at the time of mounting the multilayer ceramic capacitor on a board, such that the number of stacked layers may be increased in order to implement the multilayer ceramic capacitor having high capacitance.

As the number of stacked layers is increased as described above, a relationship between the thickness T and the width W of the ceramic body may satisfy $T/W > 1.0$, since the stacking direction of the dielectric layers in the ceramic body is the equivalent of the thickness direction.

According to the embodiment of the present invention, the multilayer ceramic capacitor is manufactured in such a manner that the relationship between the thickness T and the width W of the ceramic body satisfies $T/W > 1.0$, whereby a multilayer ceramic capacitor having high capacitance may be implemented.

Meanwhile, as the multilayer ceramic capacitor is manufactured in such a manner that the relationship between the thickness T and the width W of the ceramic body satisfies $T/W > 1.0$, the multilayer ceramic capacitor may topples over when being mounted on the board to cause defects in reliability such as a short-circuit and the like.

However, according to the embodiment of the present invention, at least one corner of the ceramic body 10 in the length, width, and thickness directions may have a round shape, and when a radius of curvature of the corner is defined as 'a', $0.01 \leq a/T \leq 0.07$ is satisfied, whereby a short defect due to the MLCC being toppled over when it is mounted on the board can be prevented.

Namely, since the MLCC 1 is manufactured as described above, although the relationship between the thickness T and the width W of the ceramic body 10 satisfies $T/W > 1.0$, the MLCC 1 does not topple over when being mounted on the board, ensuring excellent reliability thereof.

Meanwhile, in a manufacturing process of the multilayer ceramic capacitor, ceramic bodies may collide with each other to generate a chipping defect. However, according to an embodiment of the present invention, the at least one corner of the ceramic body 10 in the length, width, and thickness directions may have a round shape, and when the radius of curvature of the corner is defined as 'a', $0.01 \leq a/T \leq 0.07$ may be satisfied, whereby a chipping defect can be prevented.

Thus, the MLCC having excellent reliability can be implemented.

In a case in which the ratio (a/T) of the radius of curvature 'a' of the corner to the thickness T of the ceramic body 10 is less than 0.01, the corner and a vertex portion of the ceramic body 10 are insufficiently polished to cause a chipping defect, such that a high capacitance MLCC having excellent reliability may not be implemented.

Meanwhile, if the ratio (a/T) of the radius of curvature 'a' of the corner to the thickness T of the ceramic body 10 exceeds 0.07, the corner and the vertex portion of the ceramic body 10 are excessively polished to cause a defect in which the MLCC topples over when being mounted on a board.

According to an embodiment of the present invention, at least one corner of the ceramic body 10 in the length, width, and thickness directions has a round shape, and when a radius of curvature of the corner is defined as 'a', the corner and the vertex portion of the ceramic body 10 may be polished such that $0.01 \leq a/T \leq 0.07$ is satisfied.

The polishing may be performed by using a polishing device, and the polishing device is not particularly limited, as long as it may be used to polish a general ceramic body.

Since the ceramic body is polished before a sintering process, a chipping defect in which the ceramic bodies 10 having brittleness after the sintering process collide with each other to be broken during a transfer process to perform a process of manufacturing an MLCC can be prevented.

Also, by polishing the ceramic body 10 before the sintering process, when the MLCC is mounted on a board after being sintered, a corner of the ceramic body 10, in particular, a corner of the ceramic body 10 in the length direction, has a round shape, such that a short defect due to the toppling of the MLCC may be prevented.

Figure 3:
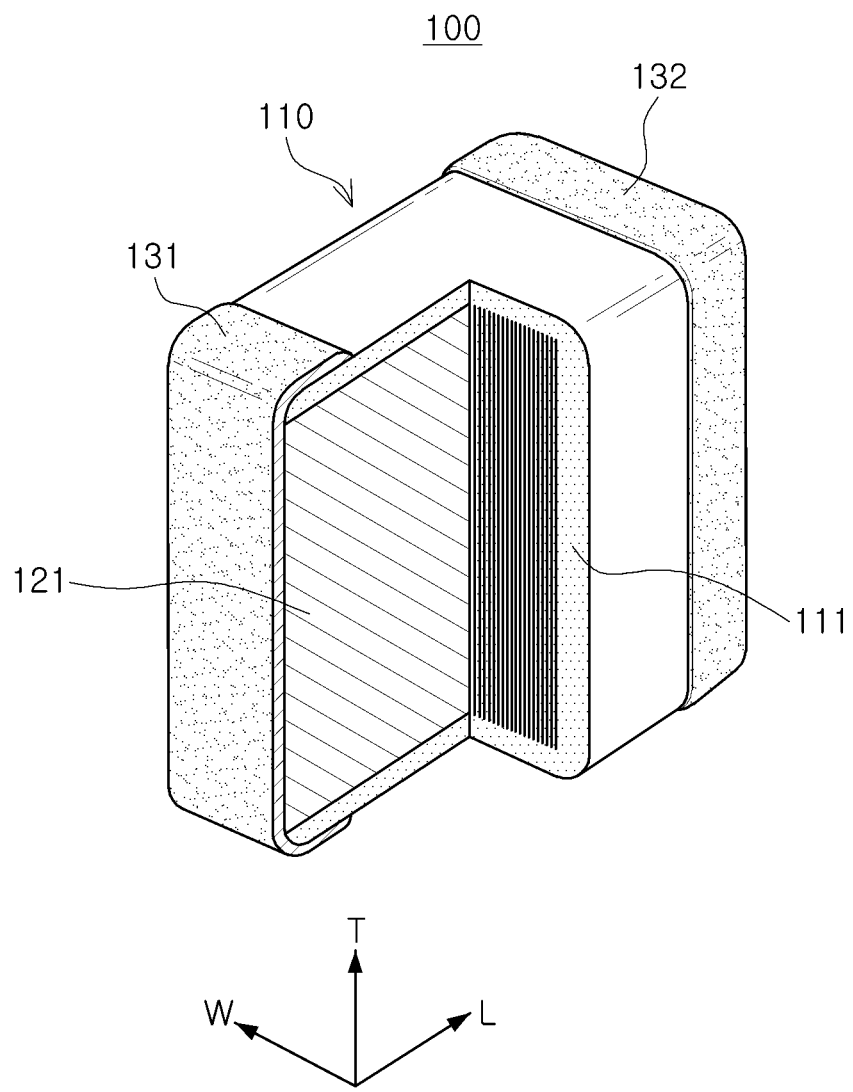
FIG. 3 is a schematic partially cutaway perspective view of a multilayer ceramic capacitor (MLCC) according to another embodiment of the present invention.

FIG. 3 is a schematic partially cutaway perspective view of an MLCC according to another embodiment of the present invention.

Figure 4:
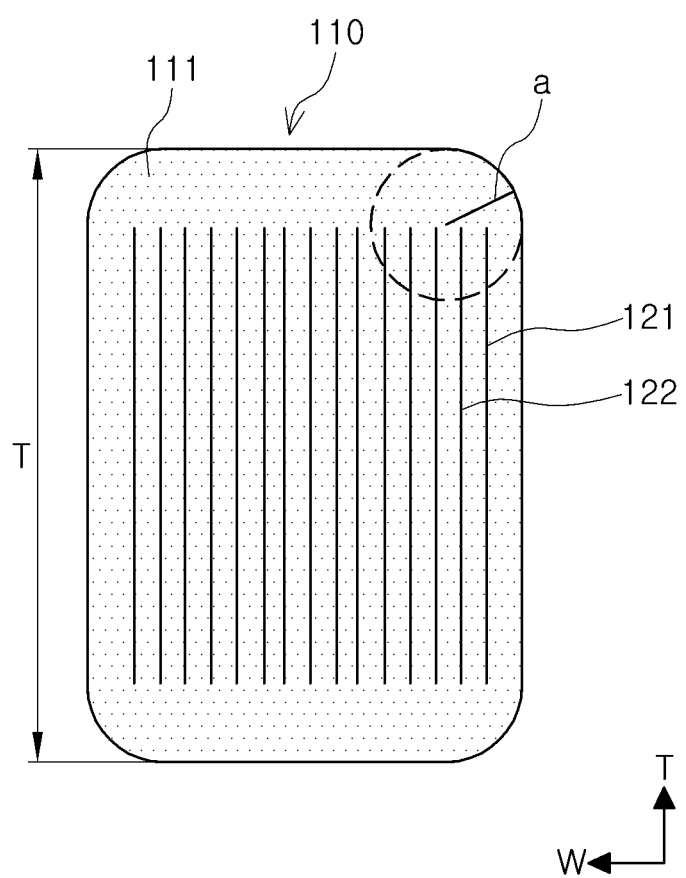
FIG. 4 is a cross-sectional view of the MLCC of FIG. 3 taken in a width direction.

FIG. 4 is a cross-sectional view of the MLCC of FIG. 3 taken in a width direction.

Referring to FIGS. 3 and 4, in an MLCC 100 according to another embodiment of the present invention, a 'length direction' is defined as an 'L' direction, a 'width direction' is defined as a 'W' direction, and a 'thickness direction' is defined as a 'T' direction of FIG. 3. Here, the 'width direction' may be used as the same meaning as a direction in which dielectric layers are stacked (that is, a stacking direction).

Namely, as illustrated in FIGS. 3 and 4, unlike the MLCC according to the forgoing embodiment of the present invention, in the MLCC 100 according to another embodiment of the present invention, the stacking direction is the equivalent of the width direction of the ceramic body 110.

As described to be below, the MLCC 100 according to another embodiment of the present invention may have a vertical mounting structure in which internal electrodes are disposed to be perpendicular to a board when the MLCC 100 is mounted on the board.

Other features of the MLCC according to another embodiment of the present invention are the same as those of the MLCC according to the embodiment of the present invention as described above, so a description thereof will be omitted.

Hereinafter, the present invention will be described in more detail through examples, but the present invention is not limited thereto.

In the present examples, with respect to MLCCs including the dielectric layers 1 having an average thickness of 0.6 μm or less, the frequency of the occurrence of a chipping defect and the frequency of a phenomenon in which the MLCC topples over when being mounted on a board were tested, according to the ratio of the radius of curvature 'a' of the corner of the ceramic body to the thickness T of the ceramic body.

The MLCCs according to the examples of the present invention were respectively manufactured as follows.

First, a slurry containing a barium titanate ($BaTiO_3$) powder having an average particle diameter of 0.1 μm, was applied to carrier films and dried thereon to prepare a plurality of ceramic green sheets having thicknesses of 1.05 μm and 0.95 μm, thereby forming the dielectric layers 11.

Then, a conductive paste for an internal electrode including 40 to 50 parts by weight of a nickel powder having a nickel particle average diameter of 0.1 to 0.2 μm was prepared.

After the conductive paste for an internal electrode was applied to the green sheets by a screen printing method to thereby form internal electrodes, 500 or more dielectric layers were stacked to thereby form a stacked body.

Then, the stacked body was compressed and cut to thereby form chips each having a ratio of thickness to width of greater than 1.0 and a size of a 0603 (length×width) standard, and the chips were sintered at a temperature of 1050 to 1200° C. under a reducing atmosphere in which $H_2$ is included in an amount of 0.1% or less.

A polishing process was performed on respective corners and vertexes of the chip by a polishing device before a sintering process.

The polishing process was performed such that the corners of the chip have a round shape and have a radius of curvature within a predetermined range.

Thereafter, a process of forming external electrodes, forming a plating layer, and the like, was performed to fabricate an MLCC.

Comparative examples were manufactured according to the same method as that of the present examples, except that the ratio of the radius of curvature 'a' of the corner of the ceramic body to the thickness T of the ceramic body was within a different numerical range as that of the present invention.

Table 1 shows comparison results of the frequency of a chipping defect occurrence and the frequency of a phenomenon in which the MLCC topples over when being mounted on a board, according to the ratio of the radius of curvature 'a' of the corner of the ceramic body to the thickness T of the ceramic body.

If a sample had any one of the chipping defect and toppling defect, the sample was determined to be defective.

TABLE 1

| Sample No. | a/T | Frequency of Chipping Defect | Frequency of Phenomenon in which MLCC topples over when being mounted |
|---|---|---|---|
| *1 | 0 | 10/100 | 0/50 |
| *2 | 0.005 | 7/100 | 0/50 |
| 3 | 0.01 | 0/100 | 0/50 |
| 4 | 0.02 | 0/100 | 0/50 |
| 5 | 0.03 | 0/100 | 0/50 |
| 6 | 0.04 | 0/100 | 0/50 |
| 7 | 0.05 | 0/100 | 0/50 |
| 8 | 0.06 | 0/100 | 0/50 |
| 9 | 0.07 | 0/100 | 0/50 |
| *10 | 0.08 | 0/100 | 3/50 |

*Comparative example

Referring to [Table 1], in the case of samples 1 and 2 as comparative examples, in which the ratio of the radius of curvature 'a' of the corner of the ceramic body to the thickness T of the ceramic body was less than 0.01, it could be confirmed that a chipping defect was generated to degrade reliability.

Also, in the case of sample 10 as a comparative example, in which the ratio of the radius of curvature 'a' of the corner of the ceramic body to the thickness T of the ceramic body exceeded 0.07, it could be confirmed that a defect in which the MLCC toppled over when being mounted on a board was generated, resulting in low reliability.

On the other hand, in the case of samples 3 through 9, in which the numerical range of the present invention was satisfied, the chipping defect and the defect in which the MLCC toppled over being mounted on a board were not generated, and thus, a high capacitance MLCC having excellent reliability could be implemented.

Mounting Board for MLCC

Figure 5:
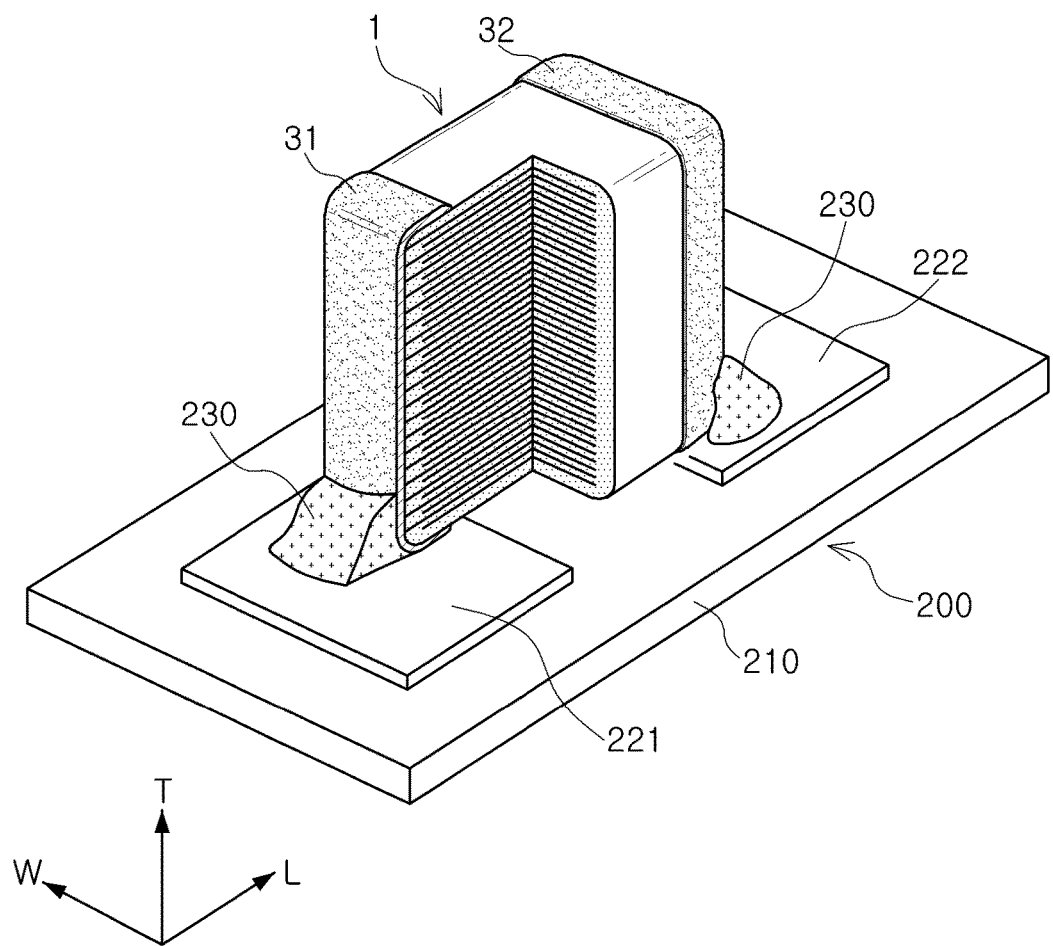
FIG. 5 is a perspective view illustrating a state in which the MLCC of FIG. 1 is mounted on a printed circuit board (PCB)

FIG. 5 is a perspective view illustrating a state in which the MLCC of FIG. 1 is mounted on a printed circuit board (PCB).

Figure 6:
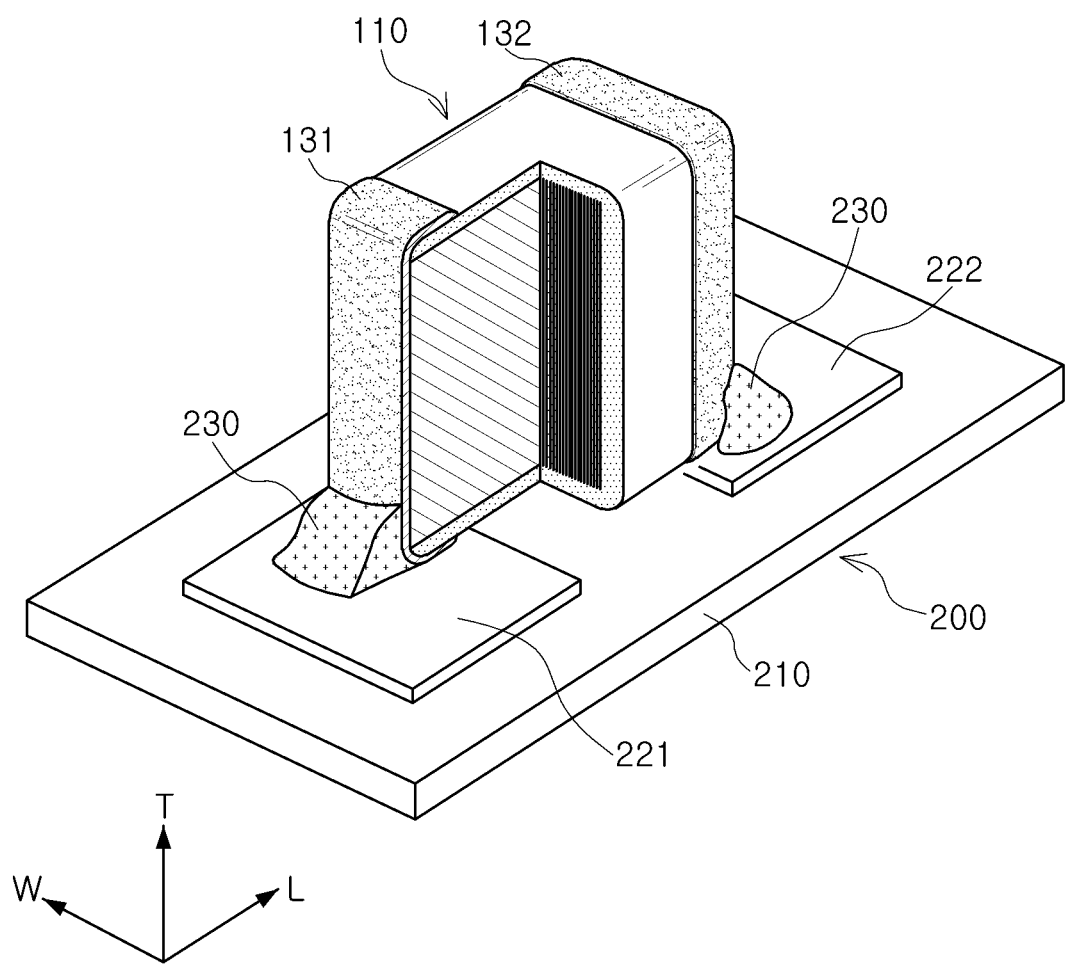
FIG. 6 is a perspective view illustrating a state in which the MLCC of FIG. 3 is mounted on a PCB.

FIG. 6 is a perspective view illustrating a state in which the MLCC of FIG. 3 is mounted on the PCB.

Referring to FIG. 5, a mounting board 200 for the MLCC 1 according to the embodiment of the present invention may include: a printed circuit board (PCB) 210 having the MLCC 1 mounted thereon to be horizontal with respect to the PCB, and first and second electrode pads 221 and 222 formed on an upper surface of the PCB 210 to be spaced part from each other.

Here, the first and second external electrodes 31 and 32 of the MLCC 1 may be electrically connected to the PCB 210 by a soldering part 230 while being positioned to be in contact with the first and second electrode pads 221 and 222, respectively.

Also, referring to FIG. 6, the mounting board 200 for the MLCC 100 according to the embodiment of the present invention may include: the PCB 210 having the MLCC 100 mounted thereon to be vertical with respect to the PCB, and the first and second electrode pads 221 and 222 formed on the upper surface of the PCB 210 to be spaced part from each other.

The mounting board for the multilayer ceramic electronic component according to another embodiment of the present invention as described above may have a multilayer ceramic electronic component mounted thereon, the multilayer ceramic electronic component including a ceramic body having a hexahedral shape, including dielectric layers, and satisfying $T/W > 1.0$ when a length of the ceramic body is defined as L, a width of the ceramic body is defined as W, and a thickness of the ceramic body is defined as T and in this case, the multilayer ceramic electronic component may include a high capacitance multilayer ceramic capacitor.

In addition, in the mounting board for the multilayer ceramic electronic component according to another embodiment of the present invention as described above, even in the case in which the multilayer ceramic capacitor is mounted on the mounting board to be horizontal or vertical with respect to the mounting board, since a corner of the ceramic body has a round shape and when a radius of curvature of the corner is defined as 'a', $0.01 \leq a/T \leq 0.07$ is satisfied, defects due to the multilayer ceramic electronic component toppling over when being mounted on the board may not be generated.

Therefore, the mounting board for the multilayer ceramic electronic component including the multilayer ceramic capacitor having high capacitance and excellent reliability may be implemented.

As set forth above, according to the embodiments of the present invention, the multilayer ceramic electronic component having excellent reliability, while having high capacitance, can be implemented.

In detail, a chipping defect in which the ceramic bodies are damaged due to collision therebetween or collision with other components can be prevented, and defects in which the multilayer ceramic electronic component having high capacitance topples over when being mounted on a board can be prevented.

Therefore, the multilayer ceramic electronic component having high capacitance and excellent reliability can be implemented.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body having a hexahedral shape, including dielectric layers;
   first and second internal electrodes stacked in a thickness direction in the ceramic body to face each other, having the respective dielectric layers interposed therebetween; and
   first and second external electrodes disposed on opposite surfaces of the ceramic body in a length direction and electrically connected to the first and second internal electrodes, respectively,
   wherein the ceramic body satisfies $T/W > 1.0$, in which T is a thickness of the ceramic body determined in the thickness direction of the ceramic body and W is a width of the ceramic body determined in a width direction,
   $0.01 \leq a/T \leq 0.07$ is satisfied, in which 'a' is a radius of curvature of a round corner of a cross-section in a width-thickness plane, and
   the dielectric layers are stacked in the thickness direction in an amount of 500 layers or more.

2. The multilayer ceramic electronic component of claim 1, wherein when an average thickness of the dielectric layers is defined as td, $0.1 \, \mu m \leq td \leq 0.6 \, \mu m$ is satisfied.

3. The multilayer ceramic electronic component of claim 1, wherein the first and second internal electrodes respectively have a thickness of 0.6 μm or less.

4. A mounting board for a multilayer ceramic electronic component, the mounting board comprising:
   a printed circuit board having first and second electrode pads disposed thereon; and
   a multilayer ceramic electronic component mounted on the printed circuit board,
   wherein the multilayer ceramic electronic component includes: a ceramic body having a hexahedral shape, including dielectric layers;
   first and second internal electrodes stacked a thickness direction in the ceramic body to face each other, having the respective dielectric layers interposed therebetween; and first and second external electrodes disposed on opposite surfaces of the ceramic body in a length direction and electrically connected to the first and second internal electrodes, respectively,
   wherein the ceramic body satisfies $T/W > 1.0$, in which T is a thickness of the ceramic body determined in the thickness direction of the ceramic body and W is a width of the ceramic body determined in a width direction,
   $0.01 \leq a/T \leq 0.07$ is satisfied, in which 'a' is a radius of curvature of a round corner of a cross-section in a width-thickness plane, and
   the dielectric layers are stacked in the thickness direction in an amount of 500 layers or more.

5. The mounting board of claim 4, wherein when an average thickness of the dielectric layers is td, $0.1 \, \mu m \leq td \leq 0.6 \, \mu m$ is satisfied.

6. The mounting board of claim 4, wherein the first and second internal electrodes respectively have a thickness of 0.6 μm or less.

* * * * *